March 15, 1966  S. L. SLOMSKI  3,241,029
PORTABLE LIGHTING UNIT
Filed Sept. 24, 1962

Inventor:
Stanley L. Slomski
by Henry T. Olsen
His Attorney

United States Patent Office 3,241,029
Patented Mar. 15, 1966

3,241,029
PORTABLE LIGHTING UNIT
Stanley L. Slomski, Chardon, Ohio, assignor to General
Electric Company, a corporation of New York
Filed Sept. 24, 1962, Ser. No. 225,647
8 Claims. (Cl. 320—40)

This invention relates to a portable lighting unit and, more particularly, to a portable rechargeable battery unit having a built-in battery charger with automatic shut-off of the charging current when the charge has reached a predetermined voltage level.

There is a well recognized need for such a portable battery unit and charging circuit therefor which is portable and economical to use in many fields, and particularly in the photographic lighting field. Many battery charging circuits have been devised which utilize saturable reactors or thermosensitive elements to turn off the charging current or provide a trickle current to the battery and prevent full rate charging of the battery once the voltage has reached a predetermined voltage level. The disadvantages of these types of battery chargers are that they are heavy, not easily portable and relatively expensive. It is an object of this invention to provide a battery unit which overcomes the faults of the prior devices.

The reliability of semiconductor devices is now well recognized. It is an object of this invention to utilize the advantages of semiconductor devices by providing a battery charger and control circuit for turning off the charging current therefor which utilizes a semiconductor zener diode in a conductive mode as a constant voltage reference device. A further object of this invention is to provide a battery charger utilizing a transistor as a comparator in the switching operation and a diode which provides for temperature compensation so that the voltage to which the battery is charged before the charging current is turned off is not subject to ambient conditions.

In accordance with the above-mentioned objects, there is provided a battery charging circuit which comprises a source of direct current for charging said battery. A voltage sampling circuit and a constant voltage reference circuit are connected to the battery. A transistor of either the PNP or NPN type compares the voltage in each circuit and actuates a relay circuit when the voltage level of the battery reaches a predetermined level, preventing further charging of the battery.

In a further aspect of the invention an incandescent lamp is connected in both the charging and discharging circuit for the battery. When the battery is being charged, the lamp operates at a low level and serves as an indicator lamp and ballasting impedance. When the circuit is switched for operation from the battery, the lamp operates as a bright incandescent light source suitable for photographic purposes.

Figure 1:
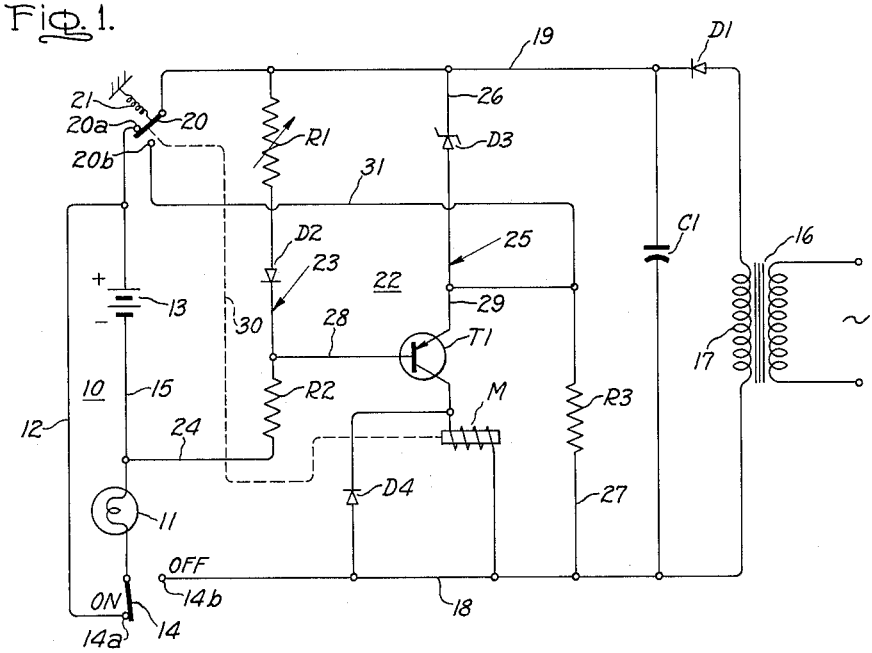
FIG. 1 is a circuit diagram of one of the embodiments of the invention.

As shown in FIG. 1 an operating circuit 10 for an incandescent lamp 11 is provided comprising a conductor 12 from the positive pole of a rechargeable battery 13 through a two-way switch 14. From the negative pole of the battery 13 a conductor 15 is connected to the lamp 11 to complete operating circuit 10. Thus, when the switch 14 is connected to terminal 14a thereof the lamp 11 operates from the battery 13 as a light source suitable for many purposes.

With the switch 14 connected to terminals 14b, a charging circuit for the battery 13 is formed including a transformer 16 having a secondary 17 connected to switch 14 by conductor 18 and thence, through the lamp 11, to the negative pole of the battery. The other side of secondary 17 is connected to the positive pole of the battery 13 by a conductor 19 through a diode D1 and a double-throw relay switch 20. The switch 20 is normally closed on terminal 20a as indicated by spring 21 to complete the charging circuit.

The switch 20 is shifted to terminal 20b by a control circuit 22 for the purpose of turning off the charging current to the battery when the battery reaches a fully charged state. The control circuit includes a voltage sampling circuit 23 connected by a conductor 24 in parallel with the battery 13. A constant voltage reference circuit 25 is connected by conductors 26 and 27 to the battery 13 and to the lamp 11 so as to be in parallel charging relation therewith. The voltage sampling circuit 23 includes a series hook up of a variable resistance R1, a diode D2 and a fixed resistance R2. The constant voltage reference circuit 25 comprises a series hook up of a zener diode D3 and resistance R3. As is well known, the zener diode D3 is a PN junction rectifier particularly constructed to carry current at a voltage above its zener level in its normally high resistance direction without damage to the junction.

The voltage difference between the constant voltage reference circuit 25 and the voltage sampling circuit 23 is compared by a PNP transistor T1, the voltage of the sampling circuit appearing at the base of the transistor through conductor 28 and the voltage of the reference circuit being applied to the emitter through conductor 29. The collector of the transistor T1 is connected through a relay coil M to the voltage source. The relay coil M actuates the relay switch 20 as indicated by the dotted line 30. The normally open contact 20b forms a holding circuit for the relay coil M through conductor 31 and transistor T1 when the battery has reached a predetermined charge level so as to prevent further charging. The transistor T1 being temperature sensitive, the diode D2 is provided in the sampling circuit so as to remove the temperature variable characteristic of transistor T1. That is, as the ambient temperatures or operating temperatures of the circuits vary, the temperature characteristics of D2 and T1 being similar will vary in the same fashion and the differential voltage applied to transistor T1 is therefore approximately constant and determinative of the battery charge level and not of ambient temperature changes.

In the operation of the circuit the primary of the transformer 16 may be plugged in, for example, a 120 volt, 60 cycle line, the output being a step-down to approximately 13 volts. The diode D1 provides a unidirectional current through the battery 13 for charging when the switch 14 is connected to the "OFF" terminal 14b. When the switch is put to the "ON" terminal 14a the lamp will be lit, the battery will be discharged and the input from transformer 16 is disconnected. Since the charging circuit is disconnected by operation of the switch 14, damage to the charging circuit from the lamp is prevented. Thus, it is possible to use the unit for lighting, even with the recharger plugged into a wall outlet.

With the switch 14 at the "OFF" terminal 14b, initially, since the normally closed contact 20a is connected, the charging circuit is complete through the battery, building up the voltage thereon. The constant voltage reference circuit through zener diode D3 is completed through resistance R3 which resistance must be sufficient to maintain the voltage appearing on diode D3 above the zener level thereof, and current flows therethrough. If the zener diode is not maintained in a conductive mode, but is used as a switching device, the voltage at which the battery charging stops is erratic and uncontrollable. The zener voltage therefore appears on the emitter of the transistor T1 with a high current so that the emitter is in condition for transfer of electrons and thus, a base-emitter current which would forward bias the transistor T1. However, the voltage sampling network 23 has little current flowing therethrough since the resistance R1 and R2 are greater than the resistances of R3 and of the battery 13. Also, the voltage of the network 23 is small with respect to the reference circuit, since it is referenced only to the potential across the battery while the reference circuit 25 has the additional voltage drop across the resistive load element 11. With low current and lower voltage appearing on the base of transistor T1, no, or at least insufficient, base-emitter current flows and therefore emitter-collector current is not possible. The transistor T1 may thus be said to be turned off.

The voltage applied through the sampling circuit 23 rises with respect to the reference circuit 25 due to further charge placed on the battery since the effect of a higher voltage on zener diode D3 is merely to rapidly increase the amount of current flowing therethrough. By proper setting of the variable resistance R1, only when the battery reaches full charge, will the current through the sampling circuit 23 provide electrons on the base of transistor T1 sufficient to permit a base-emitter current. This forward biasing of the base-emitter junction, permits an emitter-collector current which actuates relay coil M to move switch 20 to contact 20b. With the removal of the battery 13 from the charging circuit, the base-emitter current increases, thereby increasing the emitter-collector current through holding circuit conductor 31. The increased current to the relay coil insures positive relay action.

Diode D4 provides a short circuit for the collapsing magnetic field of coil M, protecting transistor T1 from inductive voltage transients. Since the relay is connected in the rectified current circuit, a capacitor C1 is provided which stores energy on the conducting half cycle and releases energy on the non-conducting half cycle for maintaining the relay in a single position. The charging current to battery 13 remains disconnected until the transformer 16 is disconnected or switch 14 is moved to terminal 14a to break the holding circuit.

It should be noted that the above circuit provided inherent protection from overheating in that an overheated condition of the transistor T1 causes it to become conductive, operating the relay and stopping charging action. A distinctive advantage of the circuit is the elimination of the voltage sensitive relay that was customarily used for turning off the battery charging circuits previously. Since the voltage sensitivity is in the semiconductor circuit, the relay M may be a low cost direct current operated relay having a wide voltage sensitivity. Previous relays also had built-in temperature compensation which may have been of a bimetal thermal type which changed the voltage operation of the relay in response to temperature conditions. Temperature herein is compensated for primarily by the provision of semiconductor diode D2 which will vary its electrical characteristics with the varients of characteristics of transistor T1. Therefore, no extra bimetal element need be provided in the relay and add to its cost.

Figure 2:
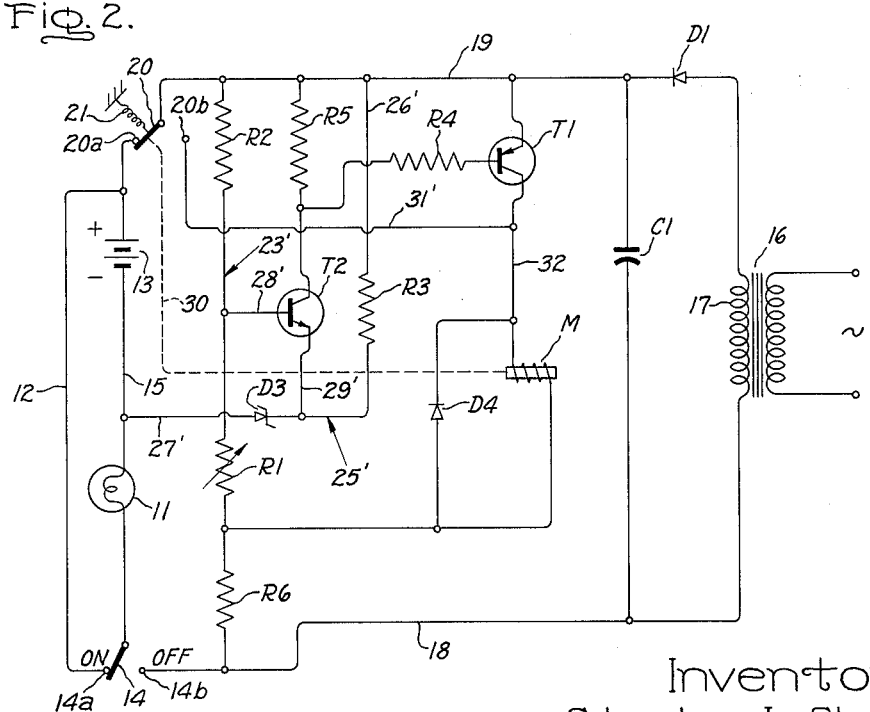
FIG. 2 is a circuit diagram of another embodiment which measures battery voltage on the non-charging half cycle.

The embodiment of FIG. 2 is similar to the above except that the voltage sampling circuit 23' is connected across the battery 13 and the lamp 11 and the reference voltage circuit 25' is connected across the battery. This enables operation of the relay coil M from the battery only on the non-charging half cycle since the comparing transistor base is connected to the higher voltage drop. In this condition, the voltage sampling circuit is more truly responsive to battery voltage with less influence by line voltage changes and internal resistance conditions of the battery. Also, the addition of a positive feedback resistor makes transistor operation very rapid and gives temperature independence over a wide range. It requires, however, additional amplification by, as shown, a reverse biased NPN transistor T2 in addition to the PNP transistor T1 provided above to provide sufficient over voltage and proper phase shift so as to insure reliable relay operation at the time of cut off.

The circuit of FIG. 2 comprises a transformer 16, as above, with the secondary 17 connected through rectifying diode D1 to the battery 13 by conductor 19 through switch 20. The circuit is completed from the negative pole of the battery by conductor 15 through the lamp 11, switch 14, and conductor 18. As above mentioned, the voltate sampling circuit 23' consisting of R1 and fixed resistances R2 and R6 is connected in parallel to the battery and the lamp. The voltage sampling circuit output is connected to the base of a comparator transistor T2 which in this case is of the NPN type by conductor 28'. The constant voltage reference circuit 25' comprising a resistance R3 and a zener diode D3 connected in series is placed across the battery by conductors 26' and 27', the voltage through the constant voltage reference circuit being connected to the emitter of the transistor T2 by conductor 29'. The collector of transistor T2 is connected through a resistance R4 to the base of PNP transistor T1, the collector thereof being connected by conductor 32 through relay coil M to the opposite pole of the battery through resistance R6 and the lamp 11. The resistance R6 therefore provides a positive feedback to the transistors as they begin to conduct. The collector of the transistor T2 may be connected to conductor 19 through a resistance R5 to insure its definite load impedance. Free wheeling diode D4 is provided as above to provide protection for the transistor T1. Normally closed contact 20a is provided in the charging circuit and normally open contact 20b is provided in the relay circuit for forming a holding circuit for the relay upon activation thereof through conductor 31'. A capacitor C1, as above, provides positive actuating means for the relay to hold it closed on the non-charging half cycle of operation.

The operation of the above circuit varies from that of FIG. 1 in that on the charging half cycle of operation the voltage sampling circuit 23' of R1, R2 and R6 being connected across the battery and the lamp is at high voltage with respect to the voltage across the reference voltage circuit with zener diode D3. Therefore the NPN transistor T2 remains non-conductive at all times during the charging half cycle. On the non-charging half cycle the voltage sampling circuit is referenced to the battery and when the voltage of the battery rises sufficiently with respect to the voltage of the zener diode, transistor T2 conducts, raising the voltage applied through resistance R4 to the base of transistor T1 rendering transistor T1 conductive and actuating the relay coil. The voltage drop across the resistor R6 provides a positive feedback, that is, it provides a voltage drop which is additive to the voltage across the transistors so as to rapidly increase conduction in transistors T1 and T2. Relay coil M being actuated, the normally closed contacts open and the normally open contacts close preventing charging of the battery and holding the relay in its actuated position until the holding circuit is disconnected, permitting switch 20 to reclose on contact 20a.

In use, the battery and battery recharging circuit are preferably combined in a single case thereby providing a compact, portable unit suitable for use with electric lamps used in photographic work. Inasmuch as the lamp 11 is connected in series with the battery on the recharging cycle it serves as a ballasting impedance for the battery and, at the same time, acts as a low level brightness indicator to inform the operator that the battery is being recharged.

Although a preferred embodiment of my invention has been disclosed, it will be understood that the invention is not to be limited to the specific arrangement of parts shown but that they may be modified within the spirit and scope of my invention as defined by the appended claims.

What I claim as new and desire to secure by Letters Patent of the United States is:

1. A portable lighting unit comprising an incandescent light source connected to a rechargeable storage battery through one terminal of a two-terminal switch; means for providing a charging current to said battery through the other terminal of said switch; and a control circuit for shutting off the charging current to the battery when said battery has accumulated a predetermined voltage comprising a relay having a coil, normally closed contacts connecting the battery to the charging current means and normally open contacts forming a holding circuit for the relay coil; and means for actuating said relay in response to the predetermined battery voltage including a constant voltage reference circuit having a zener diode and sufficient resistance to render said diode conductive, a voltage sampling circuit, and a transistor having its base connected to the voltage sampling circuit and its emitter connected to the constant voltage reference circuit, the resistance of the voltage sampling circuit being set so that the transistor is rendered conductive when the battery reaches the predetermined voltage.

2. A portable lighting unit comprising an incandescent light source connected to a rechargeable storage battery through one terminal of a two-terminal switch; means for providing a charging current to said battery through the other terminal of said switch; and a control circuit for shutting off the charging current to the storage battery when said battery has accumulated a predetermined voltage comprising switching means connecting said charging current means to said storage battery; and means for actuating said switching means in response to the predetermined battery voltage including a constant voltage reference circuit having a zener diode and sufficient resistance to render said diode continuously conductive, a voltage sampling circuit, and a transistor having its base connected to the voltage sampling circuit and its emitter connected to the constant voltage reference circuit, the resistance of the voltage sampling circuit being set so that the transistor is rendered conductive when the battery reaches the predetermined voltage.

3. A portable lighting unit comprising a light source connected to a rechargeable storage battery through one terminal of a two-terminal switch; means for providing a charging current to said battery through the other terminal of said switch; and a control circuit for disconnecting the charging current from the storage battery when said battery has accumulated a predetermined voltage comprising switching means; and means for actuating said switching means in response to the predetermined battery voltage including a constant voltage reference circuit having a zener diode and sufficient resistance to render said diode continuously conductive, a voltage sampling circuit, and a comparison circuit connected to said constant voltage reference circuit and to said voltage sampling circuit, the resistance of the voltage sampling circuit being set so as to render said comparison circuit conductive when the battery reaches the predetermined voltage.

4. A portable lighting unit comprising an incandescent light source connected to a rechargeable storage battery through one terminal of a two-terminal switch; means for providing a charging current to said battery through said incandescent light source and through the other terminal of said switch; and a control circuit for disconnecting the charging current from the storage battery when said battery has accumulated a predetermined voltage comprising switching means; and means for actuating said switching means in response to the predetermined battery voltage including a constant voltage reference circuit having a zener diode and sufficient resistance to render said diode conductive connected in parallel with said battery and said light source, a voltage sampling circuit connected in parallel with said battery only, and a comparison circuit connected to said voltage sampling circuit and to said constant voltage reference circuit, the resistance of the voltage sampling circuit being set so that the comparison circuit is rendered conductive when the battery reaches the predetermined voltage.

5. A portable rechargeable battery unit comprising a resistive load element connected to a rechargeable storage battery, means for providing a charging current to said battery through said resistive load element, and a control circuit for disconnecting the charging current from the storage battery when said battery has accumulated a predetermined voltage comprising switching means, and means for actuating said switching means in response to the predetermined battery voltage including a constant voltage reference circuit having a zener diode and sufficient resistance to render said diode continuously conductive connected in parallel with said battery, a voltage sampling circuit connected in parallel with said battery and said resistive load element whereby said voltage sampling circuit is maintained at a higher voltage than said constant voltage reference circuit while charging current is flowing to said battery and a comparison circuit connected to said voltage sampling circuit and to said constant voltage reference circuit, the resistance of the voltage sampling circuit being set so that the comparison circuit is rendered conductive, while charging current is not flowing to the battery, when the battery reaches the predetermined voltage.

6. A portable rechargeable battery unit comprising a resistive load element connected to a rechargeable storage battery, means for providing a charging current through said resistive load element and a control circuit for disconnecting said charging current from the storage battery when said battery has accumulated a predetermined voltage comprising switching means, and means for actuating said switching means in response to the predetermined battery voltage including a constant voltage reference circuit having a zener diode and sufficient resistance to render said diode conductive connected in parallel with said battery, a voltage sampling circuit connected in parallel with said battery and said resistive load element, a comparison circuit connected with said voltage sampling circuit and to said constant voltage reference circuit, the resistance of the voltage sampling circuit being set so that the comparison circuit is rendered conductive when the battery reaches the predetermined voltage, and a feedback resistor connected in series with said voltage sampling circuit and said switching means.

7. A portable rechargeable battery unit comprising means for providing a charging current to said battery unit and a control circuit for disconnecting the charging current from the storage battery when the battery has accumulated a predetermined voltage comprising a relay having a coil, means including normally closed contacts of said relay connecting the battery to the source of charging current, means including normally open contacts of said relay operable to form a holding circuit for the relay coil, and means connected across said source for actuating said relay in response to the predetermined battery voltage including a constant voltage reference circuit having a zener diode and sufficient resistance to render said diode conductive, a voltage sampling circuit, and a transistor having its base connected to the voltage sampling circuit and its emitter connected to the constant voltage reference circuit, the resistance of the voltage sampling circuit being set so that the transistor is rendered conductive when the battery reaches the predetermined voltage to energize said relay coil and complete the holding circuit.

8. A portable rechargeable battery unit comprising means for providing a charging current to said battery and a control circuit for disconnecting the charging current from the storage battery when said battery has accumulated a predetermined voltage comprising switching means connecting said source of charging current to said storage battery, and means connected across said source for actuating said switching means in response to the predetermined battery voltage including a constant voltage reference circuit having a zener diode and sufficient resistance to render said diode continuously conductive, a voltage sampling circuit, and a comparison circuit connected to the voltage sampling circuit and to the constant voltage reference circuit whereby, when the battery reaches the predetermined voltage, the comparison circuit actuates the switching means.

References Cited by the Examiner

UNITED STATES PATENTS

| | | | |
|---|---|---|---|
| 1,964,201 | 6/1934 | Harsted | 320—2 X |
| 2,277,578 | 3/1942 | Booth | 317—154 X |
| 2,628,339 | 2/1953 | Werner | 320—2 X |
| 2,751,545 | 6/1956 | Chase | 323—22 |
| 2,876,410 | 3/1959 | Fry | 320—2 |
| 2,979,650 | 4/1961 | Godshalk et al. | 320—35 |
| 3,018,432 | 1/1962 | Palmer | 320—48 X |
| 3,062,998 | 11/1962 | Medlar | 320—40 X |

OTHER REFERENCES

Army Technical Manual TM11–690: "Basic Theory and Application of Transistors," March 1959, pp 92–95.

Wilson: "Designing Transistorized Voltage Regulators," Electronics, Sept. 23, 1960, pp 62–64.

LLOYD McCOLLUM, *Primary Examiner*.